United States Patent
Hauser

(10) Patent No.: US 9,722,227 B2
(45) Date of Patent: Aug. 1, 2017

(54) CROSS-LINKED, MICROPOROUS POLYSULFONE BATTERY ELECTRODE SEPARATOR

(75) Inventor: Ray L. Hauser, Boulder, CO (US)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 13/473,344

(22) Filed: May 16, 2012

(65) Prior Publication Data

US 2012/0295154 A1  Nov. 22, 2012

Related U.S. Application Data

(60) Provisional application No. 61/486,485, filed on May 16, 2011.

(51) Int. Cl.
*H01M 2/16* (2006.01)

(52) U.S. Cl.
CPC ......... *H01M 2/1646* (2013.01); *H01M 2/166* (2013.01); *H01M 2/168* (2013.01); *H01M 2/1653* (2013.01)

(58) Field of Classification Search
None
See application file for complete search history.

(56) References Cited

U.S. PATENT DOCUMENTS

| | | | |
|---|---|---|---|
| 3,861,963 A | 1/1975 | Afrance et al. | |
| 5,389,433 A * | 2/1995 | Chang | H01M 2/14 204/295 |
| 5,882,721 A * | 3/1999 | Delnick | H01M 2/164 427/77 |
| 5,948,464 A | 9/1999 | Delnick | |
| 6,527,955 B1 * | 3/2003 | Sun | B01D 39/1692 210/500.1 |
| 2003/0152828 A1* | 8/2003 | Sun | B01D 39/1692 429/142 |
| 2006/0228606 A1 | 10/2006 | Fiebig et al. | |
| 2007/0122716 A1 | 5/2007 | Seo et al. | |
| 2008/0132632 A1* | 6/2008 | Schiraldi | C08K 9/08 524/445 |

(Continued)

OTHER PUBLICATIONS

International Search Report, International Searching Authority, PCT/US12/38170, Oct. 12, 2012, pp. 1-14.

*Primary Examiner* — Scott J Chmielecki
(74) *Attorney, Agent, or Firm* — Cantor Colburn LLP

(57) ABSTRACT

A cross-linked microporous polysulfone or polysulfone copolymer battery electrode separator membrane are described. Such membranes, which would otherwise be soluble above a particular, generally high temperature in selected battery electrolyte systems, once at least in part cross-linked, swell in the electrolyte at the particular higher temperature instead of dissolving. When the membrane separators are restrained between solid electrodes in a battery, the separator cannot increase in bulk volume, and the swelling occurs within the pores with the pore volume decreasing from its original bulk volume. The drop in pore volume causes the battery current density to drop, thereby reducing the heat generation within the hot area of the battery. This process provides a measure of safety against overheating and fires, and the battery is capable of continued usage if the overheating is localized.

24 Claims, 3 Drawing Sheets

(56) References Cited

U.S. PATENT DOCUMENTS

| | | | |
|---|---|---|---|
| 2008/0192407 A1* | 8/2008 | Lu .......................... | H01G 11/24 361/502 |
| 2008/0269366 A1* | 10/2008 | Shaffer .................. | C08L 53/02 521/134 |
| 2009/0297911 A1* | 12/2009 | Moore .................... | H01B 1/122 429/493 |
| 2010/0178567 A1 | 7/2010 | Hauser et al. | |
| 2010/0183907 A1* | 7/2010 | Hauser .................. | H01M 2/166 429/142 |
| 2012/0080147 A1* | 4/2012 | Offeman ................ | B01D 71/80 156/305 |
| 2012/0244457 A1* | 9/2012 | Kwon .................... | H01M 4/8807 429/532 |

\* cited by examiner

CROSS-LINKED, MICROPOROUS POLYSULFONE BATTERY ELECTRODE SEPARATOR

CROSS-REFERENCE TO RELATED APPLICATIONS

The present application claims the benefit of U.S. Provisional Patent Application No. 61/486,485 for "Electrode Separators For Batteries" which was filed on 16 May 2011, the entire contents of which is hereby specifically incorporated by reference herein in its entirety for all that it discloses and teaches.

FIELD OF THE INVENTION

The present invention relates generally to polymeric membranes and, more particularly, to membranes for insulating electrodes in batteries.

BACKGROUND OF THE INVENTION

Separator membranes are required to insulate the anode and cathode electrodes in storage batteries during the full range of operating conditions—from low temperature to high temperature, and across a wide range of charging and discharging rates. The membranes are necessarily thin and microporous to maximize the flow of ions during charging and discharging of the batteries.

Lithium ion batteries are noted for their superior performance, except for rare occurrences of shorts or other conditions that can cause overheating, overpressure and fires. Shorts may be caused by dendrites on electrodes growing through separators, or by presence of conducting particulates from cutting of foil electrode collectors.

Conventional separators for lithium ion batteries are constructed from non-crosslinked polyolefins or from fluoroplastics. Polyolefin separators have been found to respond adversely in the presence of electrolyte solvents at temperatures above 60° C. For example, when investigated for restrained shrinkage characteristics by placement within an embroidery hoop and exposed for 1 h to propylene carbonate, polyolefins have been observed to split or to develop pinholes.

A claimed safety feature for certain commercial polyolefin separators for lithium ion batteries is the use of a thermoplastic additive that is expected to melt and form an electrically insulating film at a melting temperature below that of the separator. This so-called "shut-down separator" has failed many tests in batteries where overheating continued to where fires ensued. An inherent difficulty with this process is the low surface tension forces of the thermoplastic additive, which have little thermodynamic motive for forming a film to displace the electrolyte that has previously been in contact with the principal polymer of the separator.

Conventional fluoroplastic separators (polyvinylidene fluoride (PVDF) and/or copolymers of polyvinylidene fluoride and hexafluoropropylene) have been observed to gel and dissolve completely in bulk propylene carbonate at temperatures around 60° C. When confined between the electrodes of a lithium ion battery where there is a limited amount of solvent, these polymers may become gels, but may continue to perform at somewhat higher temperatures. However, they are structurally weak gels having little resistance to growth of penetrating conducting dendrites that sometimes occur in batteries.

Microporous membranes made of alternative polymers such as polysulfones, and acrylonitrile-butadiene-styrene are also known to be soluble in hot electrolyte solvents such as propylene carbonate.

Effective electrode separators for batteries are further thin, porous, non-conducting to electricity, and non-degrading in electrical fields up to 4.5 volts; in addition, they must be chemically durable and physically durable in electrolyte solvents at temperatures greater than 90° C. To date, no separator has met all these criteria at a marketable cost. Polyolefin separators dominate the market, but they lack the porosity for high current-density and, as stated hereinabove, have limited durability in the presence of electrolyte solvents at temperatures above 60° C. Separators made from polyvinylidene fluoride and co-polymers are being developed with some, but not all, of these attributes, but high cost and high polymer densities remain major limitations.

SUMMARY OF THE INVENTION

Embodiments of the present invention overcome the disadvantages and limitations of the prior art by providing a microporous battery electrode separator having safer performance at higher battery temperatures.

Another object of embodiments of the present invention is to provide a microporous battery electrode separator which does not dissolve in electrolytes used in batteries at high battery temperatures.

Still another object of embodiments of the invention is to provide a microporous battery electrode separator which does not melt at high battery temperatures.

Yet another object of embodiments of the invention is to provide a microporous battery electrode separator having safer performance at high battery temperatures.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects, and in accordance with the purposes of the present invention, as embodied and broadly described herein, the microporous membrane having a porosity greater than about 30% and an air flow exceeding approximately 1 cm/min·torr at about 20° C., hereof includes: between about 10 wt % and about 90 wt % of polysulfone or sulfone copolymer, and between about 10 wt % and about 90 wt % of an aerogel.

In another aspect of the present invention and in accordance with its objects and purposes, the microporous membrane separator for electrodes of a lithium ion battery having a porosity greater than about 30%, hereof includes: between about 10 wt % and about 90 wt % of polysulfone or sulfone copolymer, and between about 10 wt % and about 90 wt % of an aerogel, the polysulfone or sulfone copolymer being sufficiently crosslinked to prevent dissolution thereof in battery electrolyte at temperature below about 75° C.

In another aspect of the present invention and in accordance with its objects and purposes, the method for producing a polysulfone or a polysulfone copolymer microporous membrane, includes the steps of: preparing a solution of polysulfone or a polysulfone copolymer including polysulfone or a polysulfone copolymer, a solvent for polysulfone or a polysulfone copolymer, a non-solvent for polysulfone or a polysulfone copolymer of polysulfone, and a thixotropic gellant, wherein the non-solvent has a higher boiling temperature than the solvent; casting the solution of the polymer; and allowing the cast solution to evaporate.

Benefits and advantages of the present invention include, but are not limited to, providing lithium ion battery electrode separators, wherein such batteries have a significant measure of safety against overheating and fires, and are capable of continued usage when the batteries experience only local overheating, by reducing the effects of local dendrites or particulate contaminants that may cause hot spots in the battery. Electronic or thermal controls on such batteries may detect these changes (from reduction in battery current or higher battery temperature) to provide instrumental warning of an impending problem that needs to be addressed. Use of polysulfones permits considerably lower cost microporous battery electrode separators than obtainable using fluoropolymers.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings.

DETAILED DESCRIPTION OF THE INVENTION

Figure 1:
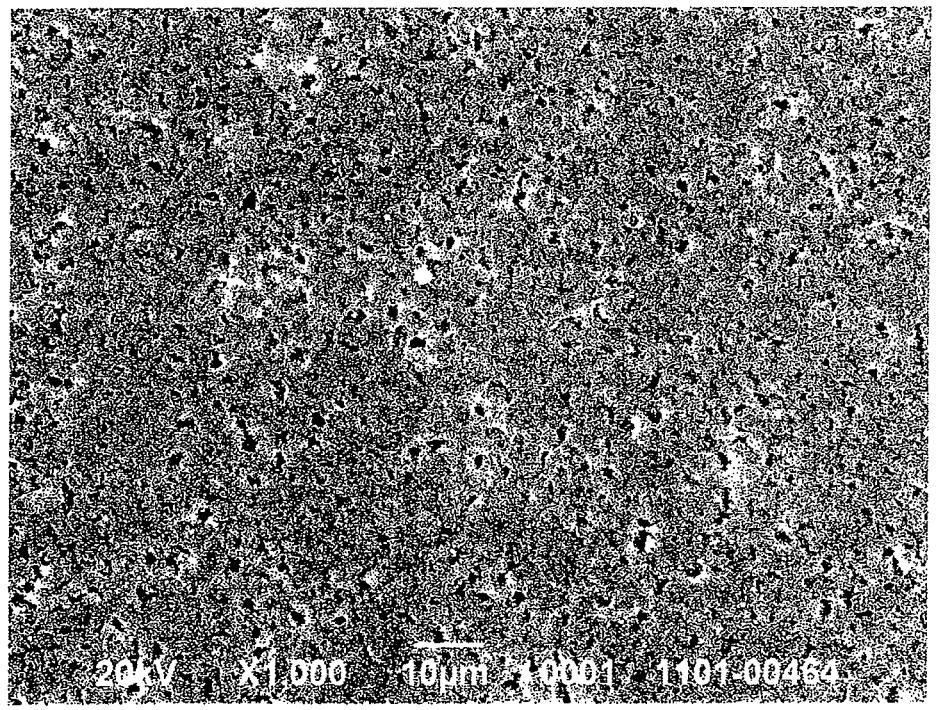
FIG. 1 is a scanning electron micrograph of the air side of a microporous polysulfone membrane of an embodiment of the present invention, where the dark spots illustrate open pores.

Briefly, the present invention includes cross-linked, microporous, polysulfone battery electrode separators. Such membranes, which would otherwise be soluble in selected battery electrolyte systems above a particular, generally high temperature, once at least in part cross-linked, swell in the electrolyte at the particular higher temperature instead of dissolving.

Polysulfone resins are polymers resulting from the reaction of phenol, 4,4'-(1-methylethylidene)bis with 1,1' sulfonylbis(4-chlorobenzene), (CAS #25154-01-2), and are thermoplastics. They are commercial resins sold with tradenames and suppliers such as Ultrason and Udel, by BASF and Solvay, respectively. BASF sells their polysulfone under the name PSU S6010, their polyether sulfone PES as E2010, E3010 and E6020, and their polyphenyl sulfone as PPSU P3010. Polysulfones are conventionally processed by injection molding or extrusion. They have a processing melt temperature of about 330° C., a tensile yield strength in the range of approximately 75-80 MPa, and a density of about 1.24 g/cc. The resins are soluble in solvents such as methylene chloride (dichloromethane), tetrahydrofuran, n-methylpyrollidone, and dimethylacetamide. Polysulfones can be cross-linked by radiation, and can be chemically cross-linked at their end-groups, methyl groups, or sulfone groups, in order to increase their durability in battery electrolytes at high temperatures. The repeating unit for ordinary polysulfone plastics is:

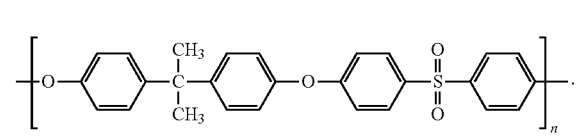

Polysulfones are expected to be stable in electrical fields present in batteries. The sulfur atom in the O=S=O group in the repeating unit for polysulfones is bonded to two phenyl groups. The strength of this bond is compared to those of other battery separators in TABLE 1.

TABLE 1

| Polymer | Bond | Bond Strength, kJ/mol | Bond Strength, V Per atom |
|---|---|---|---|
| Polyolefin and others | Aliphatic C—C | 348 | 3.61 |
| " | C—H | 413 | 4.28 |
| Fluorocarbons | C—F | 488 | 5.06 |
| | Aliphatic C—C | 348 | 3.61 |
| Polysulfone | Aliphatic C—S | 370 | 3.84 |
| " | S=O | 477 | 4.95 |
| " | Aromatic C—O | 360 | 3.73 |

References: www.science.uwaterloo.ca, and http://chemed.purdue.edu/genchem/topicreview/bp/ch10/group6.php.

In "Ionic Liquids for Electrochemical Applications," by Sigma-Aldrich Chemical Company the electrochemical stabilities of three compounds having O=S=O groups in sulfonylimides are presented, and the "electrochemical window" for these compounds is noted to be in the range of 5.5 to 6.6 volts. Thus, polysulfone is expected to remain stable at voltages that may be experienced during the charging of a lithium ion battery.

Polysulfone, polyphenyl sulfone and polyether sulfones (copolymers of sulfone) have been made into filtration membranes by the conventional sol gel process (dissolution, casting and immersion in a miscible non-solvent to extract the original solvent). For special filtrations, these polymers can be improved by the cross-linking process in accordance with the teachings of embodiments of the present invention. Sulfonated polysulfone membranes are useful for proton exchange membranes in fuel cells. The cost of polysulfone per pound is about one-half that for PVDF, and the ratio of the density of polysulfone to that for PVDF is 1.24/1.76. Therefore, a separator having the same thickness and the same porosity can have a polymer cost of about ⅓ that for membranes made from PVDF.

Reference will now be made in detail to the present embodiments of the invention, examples of which are illustrated in the accompanying drawings. It will be understood that the FIGURES are presented for the purpose of describing particular embodiments of the invention and are not intended to limit the invention thereto.

Hot, swollen cross-linked membranes were found to have physical durability and coherence, in contrast to gel formation of non-crosslinked membranes. The theory for improved cross-linked membranes is based upon the large thermodynamic forces of swelling of polymers as caused by certain electrolytes at high temperatures. See, e.g., Ray L. Hauser et al., "Swelling of Silicone Elastomers," Indust. and Eng. Chem. 48, 1202 (1956).

Batteries made with cross-linked separators in accordance with embodiments of this invention are therefore expected to provide a significant measure of safety against overheating and fires, and to allow for continued usage of batteries that experience only local overheating, by reducing the effects of local dendrites or particulate contaminants that may cause hot spots in the battery. Electronic or thermal controls on such batteries may detect these changes (by reduction in the battery current, or from higher battery temperature) to provide instrumental warning of an impending problem that needs to be addressed. This may be an advantage over some of the polyolefin battery separators which claim to possess shut-down features when overheated. Complete battery shut-down in an all-electric vehicle may be comparable to running out of fuel without a gas gauge to provide warning, but a measured decrease in current density for a battery using embodiments of the present electrode separator may allow the driver to complete his or her trip (perhaps, at a slower speed) or to the garage for a diagnosis.

Rendering the polysulfone membranes microporous may be achieved using procedures described in the EXAMPLES set forth hereinbelow, and methods described in U.S. Pat. No. 8,147,732 for "Highly Microporous Polymers And Methods For Producing And Using The Same," which issued to Kirby W. Beard on Apr. 3, 2012, said patent being hereby incorporated by reference herein in its entirety for all that it discloses and teaches. Embodiments of the present invention include the use of a gelling agent added to a polymer solution in a solvent/non-solvent mixture. The gelling agent may be a mineral such as fumed silica or alumina or bentonite. As used herein, the term "aerogel" describes a fumed, particulate or particle, as opposed to an aggregation or block of such particles, as might be used, for example, as thermal insulating tiles for the Space Shuttle. Such materials are derived from gels and are porous. Fumed silicas, such as Cab-O-Sil and Aerosil, are effective for use in generating the membranes of embodiments of the present invention, and are available with particle sizes ranging from about 7 nm to about 14 nm. Cab-O-Sil M5 is a relatively pure silica without surface treatment; Cab-O-Sil 610 is a similar product with having a slight surface treatment with a silane coupling agent; and Cab-O-Sil 720 has a heavier surface treatment with silane coupling agent, appropriate for gelling solvents having less polarity. The gelling agent produces a thixotropic solution when added in bulk volume approximately equal to that of the solution. It generates a high viscosity and, when cast in a thin film, provides sufficient strength to prevent collapse of the film while the solvent is drying (as occurs for normal lacquer-type formulations) and maintain porosity between the silica particles as the liquids evaporate.

Cross-linking of the microporous polysulfone membranes can be accomplished by the addition of cross-linking chemicals to the solution, and then by heating after the membrane has formed, as discussed hereinbelow. Alternatively, such membranes can be cross-linked by exposure to high-energy irradiation by gamma rays, high-energy electron beams, or other radiation, as is known in the art.

The polysulfone membranes of embodiments of the present invention may include addition of particulate or fibrous minerals in addition to the aerogel used to generate the porous structure. These minerals are expected to provide compressive durability to the membrane for accommodating stresses from thermal expansion of electrodes during battery charging and discharging, and to provide a measure of electrode separation if the polymer should be collapsed, melted or dissolved. Effective mineral additives are described for polyvinylidene difluoride (PVDF) membranes in "Hard Spacers In Microporous Membrane Matrix," U.S. Patent Publication No. 2010/0183907, and in "Mat Forming Spacers In Microporous Membrane Matrix," U.S. Patent Publication No. 2010/0178567, said patent publications being hereby incorporated by reference herein in their entirety for all that they disclose and teach.

The polysulfone membranes of embodiments of the present invention may further include a web of reinforcing material, woven or non-woven, to add tensile strength which may be required during assembly (particularly for wrapping in spirally-assembled batteries). The reinforcement may be coated with the polysulfone solution or it may be imbedded in a layer of the solution, or multiple coatings may be applied. Such composite separators (using PVDF polymer) are described in "Reinforced Highly Microporous Polymers," U.S. Publication No. 2010/0247894, said patent publication being hereby incorporated by reference herein in its entirety for all that it discloses and teaches.

The polysulfone membranes of this invention may strongly bond to one or more electrodes when cast thereon. Styrene-isoprene elastomer and chlorosulfonated polyethylene elastomer, when added to the solution, have been found to provide polysulfone membranes with tenacious adhesion to many surfaces. Such assembly techniques (for PVDF separators) are described in patent application PCT/US2011/146064, which application is hereby incorporated by reference herein in its entirety for all that it discloses and teaches.

The polysulfone membranes of embodiments of the present invention may be cross-linked to improve their durability in hot electrolytes that are used in lithium ion batteries. Unmodified Ultrason S6010 from BASF, for example, dissolves in propylene carbonate, a frequent component of such electrolytes, at about 72° C. Addition of dicyandiamide to this polymer gives a product that survives melting/dissolution in propylene carbonate to approximately 130° C., likely by reaction with the end groups. Addition of about 3.6 parts per hundred resin (phr) of benzoyl peroxide to this polymer gives a product that can survive melting/dissolution in propylene carbonate to approximately 86° C., probably by cross-linking of the methyl groups. To achieve such cross-linking, a mixture of the cross-linker in polymer solution is cast, dried and heated to about 160° C.

In a similar manner to lightly cross-linked elastomers, the portions of the polysulfone molecule between cross-links act like free molecules with regard to affinity for certain solvents. Thus, as stated hereinabove, the polymer may swell in hot electrolytes, such as propylene carbonate, thereby decreasing the effective porosity of the membrane, and limiting diffusion of electrolyte through the membrane, which decreases the flow of free ions. Thus, the microporous membrane of this invention may self-limit the current density at over-temperature conditions. This effect is expected to be reversible—current limiting when the electrolyte is too hot, but returning to maximum current density when the electrolyte is at a cooler temperature—a benefit to more safe operation of lithium ion batteries. See, e.g., copending patent application entitled "Cross-Linked Battery Electrode Separator," filed on 16 May 2012 by Ray L. Hauser. Having generally described the invention, the following EXAMPLES provide additional details:

EXAMPLE 1

Coating on Non-Woven Web

A solution was prepared using about 34 g of polysulfone resin (BASF Ultrason S6010), approximately 564 ml of methylene chloride (solvent), about 34 ml of 1, 2-propanediol (non-solvent), and approximately 0.4 ml of Kenrich NZ-12 zirconate (CAS #117101-65-2, neoalkoxy zirconate) coupling agent (allows coupling to a large number of inorganic and organic substrates). About 12 g of Cab-O-Sil M-5 (a synthetic, amorphous, fumed silicon dioxide, gellant) was added to this solution, and the resulting mixture was dispersed using a high speed mixer for about 15 min. A drawdown with 250-μm gap (about 125 μm wet film) was made onto a silicone-coated release film and was allowed to dry. Upon removal from the substrate, the substrate side of the membrane was found to have a glossy surface, indicating continuity of polymer rather than surface porosity. The bulk porosity of the membrane was found to be about 33% porous, measured by weighing the membrane, wetting the air side with mineral oil, blotting, and re-weighing the wetted film (see, e.g., ASTM D6583, "Standard Test for Porosity of Paint,"). However, the membrane did not permit air flow, likely due to the thin layer of non-porous polymer on the substrate side. Porosity is defined as a fraction of the volume of voids over the total volume.

EXAMPLE 2

Cross-Linked Membrane

A clear solution was prepared with about 9.2 g of polysulfone resin (BASF Ultrason S6010), approximately 200 ml of methylene chloride, about 32 ml of tetrachloroethylene (a poor solvent), and approximately 0.5 g of 75% benzoyl peroxide (cross-linking agent). About 4.6 g of Cab-O-Sil TS-610 (treated aerogel) was added to this solution, and the resulting mixture was dispersed for about 15 min. in a high speed mixer. A drawdown was made with a 375-μm gap onto a substrate of high density polyethylene. The membrane was dried in quiescent air, and was readily removed from the polyethylene substrate. Membrane samples ranged in thickness from about 20 to about 25 μm, had an air flow rate of about 3 cm/min·torr, and a porosity of approximately 64%.

EXAMPLE 3

Cross-Linked Microporous Membrane

A clear solution was prepared with about 7 g of polysulfone resin (BASF Ultrason S6010), approximately 51 ml of methylene chloride, about 26 ml of tetrachloroethylene and approximately 0.23 g of benzoyl peroxide. About 2.8 g of Cab-O-Sil TS-610 was added to this solution, and the resulting mixture was dispersed for about 15 min. in a high speed mixer. A drawdown was made using a gap distance of approximately 250 μm onto a substrate of high density polyethylene. The dried film released easily, and had 79% porosity and an air flow of 3.2 cm/min·torr.

EXAMPLE 4

Cross-Linked Microporous Membrane

A clear solution was prepared using about 14 g of polysulfone resin (BASF Ultrason S6010), approximately 100 ml of methylene chloride, about 52 ml of tetrachloroethylene, and approximately 0.5 g of benzoyl peroxide. About 6.3 g of Cab-O-Sil TS610 was added to this solution and the resulting mixture was dispersed in a mixer for about 15 min. A wet film about 75 μm thick was made by draw-down onto high density polyethylene, and the solution was allowed to air dry. The resulting film had thickness ranging from about 18 to about 26 μm, had a porosity of 63%, and an air flow of 3.7 cm/min·torr.

Figure 2:
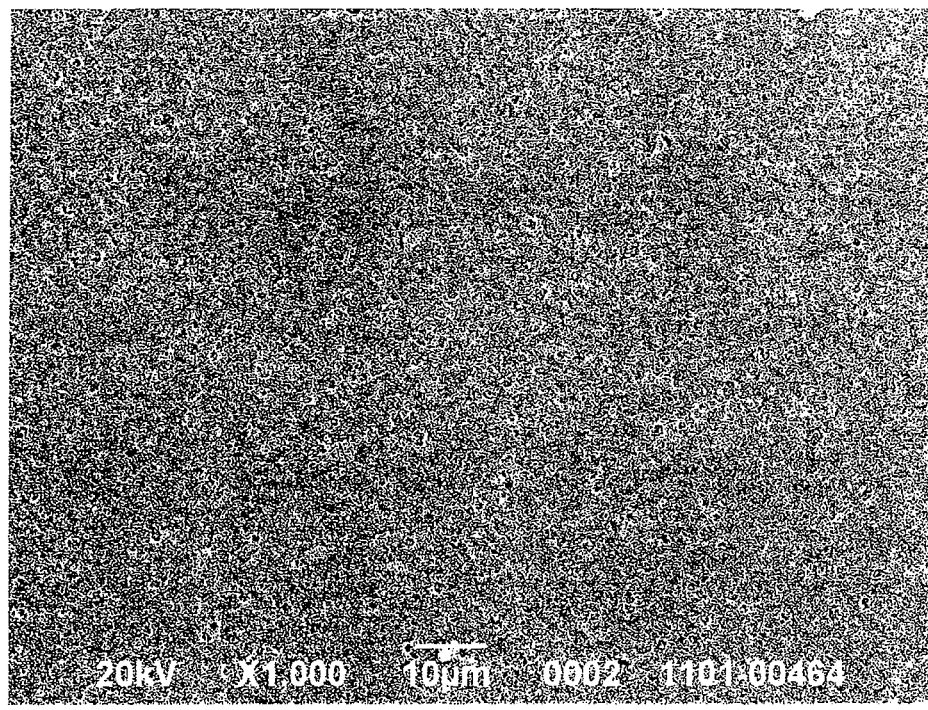
FIG. 2 is a scanning electron micrograph showing the substrate side of the microporous polysulfone membrane illustrated in FIG. 1 hereof, illustrating that fewer pores are formed on the substrate side of the membrane.
Figure 3:
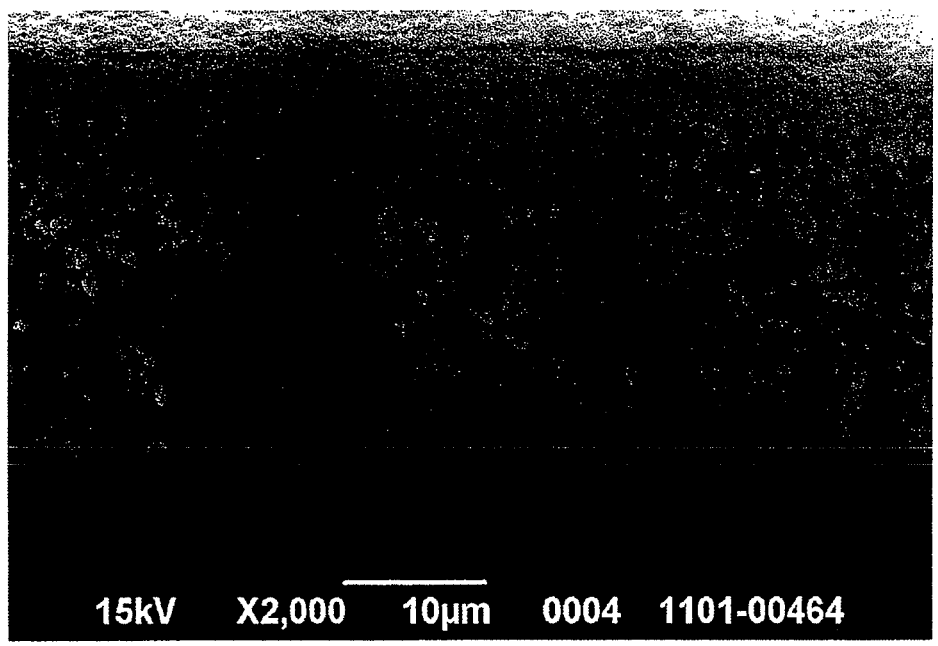
FIG. 3 is a scanning electron micrograph showing a portion of the cross-section of the microporous polysulfone membrane illustrated in FIG. 1 hereof.
Figure 4A:
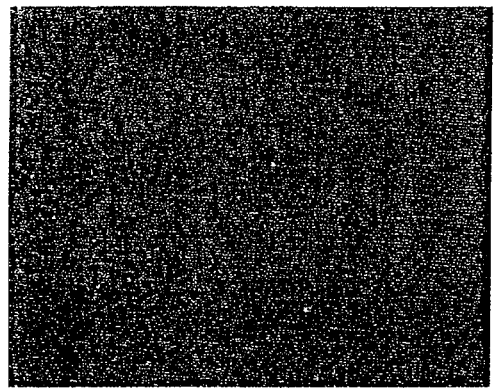
FIG. 4a shows a scanning electron micrograph of the air side of a microporous polysulfone membrane of another embodiment of the present invention.
Figure 4B:
FIG. 4b shows an energy dispersive spectrograph of a silicon map thereof.
Figure 4C:
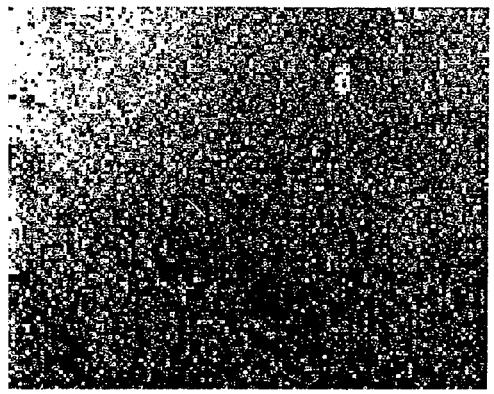
FIG. 4c shows a scanning electron micrograph of the substrate side of the microporous polysulfone membrane shown in FIG. 4a hereof.
Figure 4D:
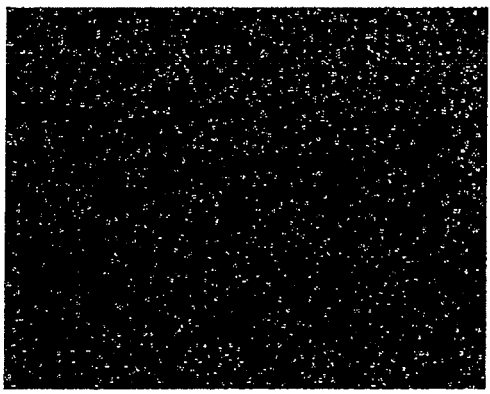
FIG. 4d shows an energy dispersive spectrograph of the silicon map thereof.

Scanning Electron Microscope (SEM) examination of the air side, the substrate side and the cross-section provided the scans of FIGS. 1, 2 and 3, respectively. FIG. 4 has silicon maps made by Electron Dispersive Analysis to the right of SEM photos of the two surfaces that show locations (bright spots) containing silica. Mapping is an SEM technique that can be descriptive since it shows by color distinction where certain elements (in this case silicon from the fumed silica) are located. The distribution of fumed silica is observed to be uniform in these scans. These illustrations show a matrix that appears to be more like a packing of spheres (centered by aerogel particles) than like a highly reticulated structure as seen in membranes made by the process of Beard, supra.

EXAMPLE 5

Cross-Linked Membrane

Solutions of polysulfone resin were prepared with about 4.23 g of Ultrason S6010, and approximately 116 ml of methylene chloride. For the A membrane, about 0.5 g of dicyandiamide was added, while for the B membrane, approximately 0.16 grams of 75% benzoyl peroxide were added. Drawdowns were made with each of these solutions, with the films being clear and non-porous, since they contained no aerogel and no non-solvent. The films were heated in an oven at about 163° C. for about 30 min. Both films survived immersion in propylene carbonate at temperatures up to approximately 130° C., in contrast to comparable films without either of the two additives, which dissolved at about 90° C. Dicyandiamide is thought to cross-link by reaction with end groups of the polysulfone molecule, while Benzoyl peroxide is thought to react with the methyl groups of polysulfone, in a manner similar to those for dimethylsiloxane elastomers. It may be possible to crosslink polysulfone by similar reactions with di- or tri-glycidyl ethers.

EXAMPLE 6

Cross-Linked Microporous Membrane from Non-Chlorinated Solution

A solution of about 14 g of polysulfone resin, BASF S6010, was added to approximately 140 ml of tetrahydrofuran, and about 20 ml of isopropanol. About 0.5 gram of benzoyl peroxide and approximately 5 g of treated silica aerogel, Cab-O-Sil 610 were added to this solution. The resulting mixture was dispersed with a high-shear mixer rotating at about 2000 rpm for approximately 2 min. After de-aeration by centrifugation, the thixotropic mixture was spread by draw-down blade onto a silicone-treated release film using a gap of 250 μm. After drying, the opaque membrane was baked at about 162° C. for approximately 30 min. The membrane was about 25 μm thick, had 78% porosity and an air flow rate about 1.5 cm/min·torr.

EXAMPLE 7

Comparisons

Clear solutions were prepared with about 14 g of polysulfone resin (BASF Ultrason S6010), and approximately 0.5 g of benzoyl peroxide, in solutions with different concentrations of methylene chloride (solvent) and tetrachloroethylene (non-solvent), and with different concentrations of treated aerogel Cab-O-Sil TS-720. Each mixture was dispersed in a mixer for about 15 min. A wet film from a gap of 75 µm thick was made by draw-down onto high density polyethylene and the solution was allowed to air dry. The resulting film had thickness ranging from about 25 to approximately 40 µm thick. Porosities and air flow characteristics were as set forth in TABLE 2, which illustrates the effects of fumed silica and non-solvent.

TABLE 2

| Formula # | Weight: g polysulfone S6010 | Wt.: g TS-720 | Vol.: ml Methylene Chloride | Vol.: ml Tetrachloroethylene | Properties of Membrane 25-50 µm thick | |
|---|---|---|---|---|---|---|
| | | | | | Porosity % | Air Flow cm/min · torr |
| 1 | 14 | 0 | 100 | 52 | 45 | 0.2 |
| 2 | 14 | 5.7 | 100 | 52 | 74 | 8.2 |
| 3 | 14 | 5.7 | 100 | 52 | 69 | 5.2 |
| 4 | 14 | 5.7 | 126 | 26 | 67 | 0.6 |
| 5 | 14 | 5.7 | 150 | 0 | 0 | 0 |

It may be observed that a gelling agent is needed in order to obtain a structure that has sufficient through-flow of air, and that a miscible non-solvent is needed in order to obtain high porosity and good air flow. Fumed silica is one of several gelling agents that are expected to be effective. Several solvent systems are also expected to be effective, including acetonitrile, cyclohexanone, and dimethyl formamide, and non-solvents can be selected from miscible liquids with higher boiling temperature than the solvent.

It is recognized that characteristics of a substrate material can also affect the measured porosity and particularly, the measured air flow. A thin layer of relatively non-porous polymer skin at the substrate interface can give a highly asymmetric membrane with low air flow. Formation of such a layer can be affected by the surface tension of the substrate and the drying conditions used during fabrication. A glossy, non-permeable layer of polymer at this interface may be avoided by heating the substrate. One or more of the films described in TABLE 2 may have had such an impermeable layer of polymer.

The microporous membranes of this invention are particularly useful as electrode separators for batteries and as filtration films. By variations of formulation and preparation, the pore size can be modified to give desired performance characteristics.

Microporous membranes of polysulfone may be strengthened by stretch-orientation at temperatures below the melt temperature in processes conventionally used for polyamides and polyaramids. They can also be strengthened by incorporation of discontinuous fibers (e.g., glass and wollastonite), or continuous fibers, such as woven or non-woven webs of polyester or polypropylene in the solution matrix prior to casting.

Gel electrolytes are known to have higher impedance than liquid electrolytes, resulting in a decrease in current density. Gel electrolytes are a combination of swollen and gelled polymer and solvent. In embodiments of the present invention, the "gelled" polymer between cross-links provides a self-regulating feature of decreased current density and thus improves the safety of lithium ion batteries. (See, e.g., "Characterisation And Modelling Of Lithium-Ion Battery Electrolytes," Doctoral Thesis by Peter Georen, www.dissertations.se/dissertation/8b12ba4737/, wherein the electrical conductivity of gelled and liquid electrolytes was studied, and showed an effect on the physical diffusivity of the solvent in each; that is, the electrical conductivity of a lithium perchlorate solution in propylene carbonate was about 5 times greater than that of the same concentration in propylene carbonate gelled with 20% polymethyl methacrylate.).

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A microporous membrane having a porosity greater than about 30% and an air flow exceeding approximately 1 cm/min torr at about 20° C., comprising: between about 64.3 wt % and about 72.1 wt % of polysulfone or sulfone copolymer, and between about 25.6 wt % and about 33.4 wt % of an aerogel; wherein the membrane is crosslinked.

2. The membrane of claim 1, wherein the membrane is sufficiently crosslinked to prevent dissolution of the membrane in propylene carbonate or polypropylene carbonate mixed with other carbonates at a temperature below about 75° C.

3. The membrane of claim 1, wherein the aerogel comprises fumed silica or alumina.

4. The membrane of claim 1, wherein the membrane is bonded to a substrate by casting onto the substrate.

5. The membrane of claim 4, further comprising an adhesion-improving additive.

6. The membrane of claim 5, wherein the adhesion-improving additive is chosen from styrene copolymer elastomers and chlorosulfonated polyethylene elastomers.

7. The membrane of claim 4, wherein the substrate comprises a battery electrode.

8. The membrane of claim 1, further comprising discontinuous fibers mixed therewith.

9. The membrane of claim 8, wherein the discontinuous fibers are chosen from glass and wollastonite.

10. The membrane of claim 1, further comprising continuous fibers mixed therewith.

11. The membrane of claim 10, wherein the continuous fibers comprise woven or non-woven webs.

12. The membrane of claim 11, where the woven or non-woven webs are fabricated from materials chosen from polyester and polypropylene.

13. A microporous membrane separator for electrodes of a lithium ion battery having a porosity greater than about 30%, comprising between about 64.3 wt % and about 72.1 wt % of polysulfone or sulfone copolymer, and between about 25.6 wt % and about 33.4 wt % of an aerogel, the polysulfone or sulfone copolymer being sufficiently crosslinked to prevent dissolution thereof in a lithium ion battery electrolyte at temperature below about 75° C.

14. The separator of claim 13, wherein the lithium ion battery electrolyte comprises propylene carbonate or propylene carbonate mixed with other carbonates.

15. The separator of claim 13, wherein the aerogel comprises fumed silica or alumina.

16. The membrane of claim 13, wherein the membrane is bonded to a substrate by casting onto the substrate.

17. The membrane of claim 16, further comprising an adhesion-improving additive.

18. The membrane of claim 17, wherein the adhesion-improving additive is chosen from styrene copolymer elastomers and chlorosulfonated polyethylene elastomers.

19. The membrane of claim 16, wherein the substrate comprises a battery electrode.

20. The membrane of claim 13, further comprising discontinuous fibers mixed therewith.

21. The membrane of claim 20, wherein the discontinuous fibers are chosen from glass and wollastonite.

22. The membrane of claim 13, further comprising continuous fibers mixed therewith.

23. The membrane of claim 22, wherein the continuous fibers comprise woven or non-woven webs.

24. The membrane of claim 23, where the woven or non-woven webs are fabricated from materials chosen from polyester and polypropylene.

* * * * *